United States Patent [19]

Takahashi et al.

[11] Patent Number: 4,672,214
[45] Date of Patent: Jun. 9, 1987

[54] OPTICAL SWITCH HAVING LIGHT SOURCE AND RECEIVER POSITIONED STATIONARY RELATIVE TO STEERING WHEEL

[75] Inventors: Fumitaka Takahashi, Tokyo; Hideo Tsubata, Saitama; Nobuaki Oji, Saitama; Minoru Mohri, Saitama, all of Japan

[73] Assignee: Honda Giken Kogyo Kabushiki Kaisha, Tokyo, Japan

[21] Appl. No.: 751,607

[22] Filed: Jul. 3, 1985

[30] Foreign Application Priority Data

Jul. 6, 1984 [JP] Japan .................. 59-140054

[51] Int. Cl.$^4$ ............................................. G02B 27/00
[52] U.S. Cl. ........................................ 250/551; 455/602
[58] Field of Search .................. 250/551, 227, 229; 455/602

[56] References Cited

U.S. PATENT DOCUMENTS

| 4,190,318 | 2/1980 | Upton, Jr. ............................ 250/551 |
| 4,438,425 | 3/1984 | Tsuchida et al. ................... 250/551 |
| 4,456,903 | 6/1984 | Kishi et al. ......................... 250/551 |
| 4,555,631 | 11/1985 | Martens ............................. 250/551 |

FOREIGN PATENT DOCUMENTS 0166354 12/1980 Japan .................................. 455/602

0028736 2/1984 Japan .................................. 455/602

*Primary Examiner*—David C. Nelms
*Assistant Examiner*—William Oen
*Attorney, Agent, or Firm*—Irving M. Weiner; Joseph P. Carrier; Pamela S. Burt

[57] ABSTRACT

A steering switch device (200) for a vehicle having a vehicle body (1), a steering wheel (100) rotatably attached to the vehicle body, and an electrical load mounted on the vehicle body. The steering switch device (200) comprises a control means (3, 23, 24, 25, 26) for providing the electrical load with a drive control signal, the control means (3, 23, 24, 25, 26) being secured to the vehicle body (1) and constituted with a light source means (23, 24) for providing an optical signal and a light-receiving means (25, 26), and a switch means (13, 19, 20, 27) for providing the control means (3, 23, 24, 25, 26) with an operational signal, the switch means (13, 19, 20, 27) being arranged in the vicinity of the steering wheel (100) and constituted with a light-conductive path (27) for conducting the optical signal from the light source means (23, 24) to the light-receiving means (25, 26) and an optical switch (19, 20) provided in the light-conductive path (27). The switch means (13, 19, 20, 27) is adapted to be stationary relative to the vehicle body (1) irrespective of rotation of the steering wheel (100).

11 Claims, 5 Drawing Figures

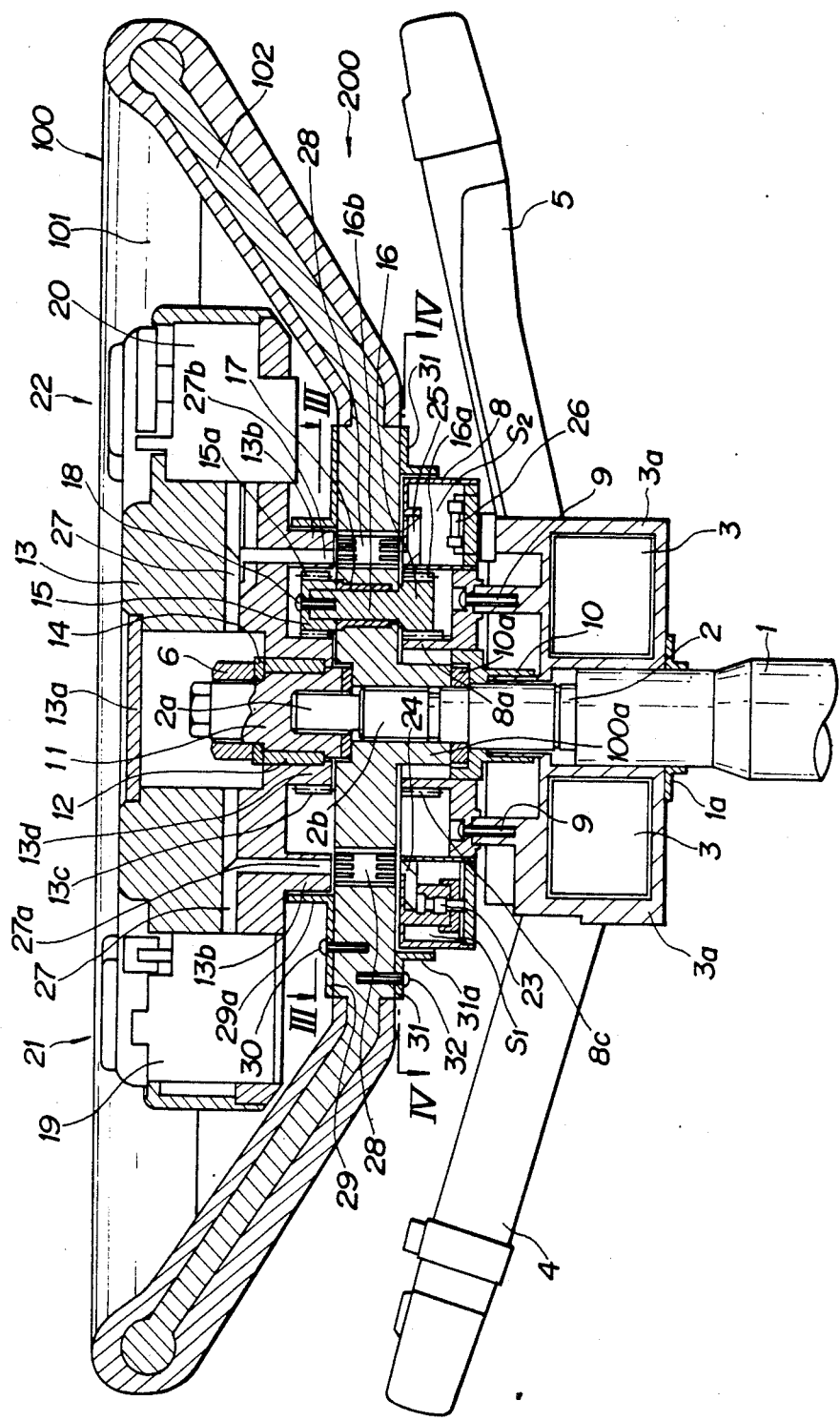

OPTICAL SWITCH HAVING LIGHT SOURCE AND RECEIVER POSITIONED STATIONARY RELATIVE TO STEERING WHEEL

BACKGROUND OF THE INVENTION

1. Field of the Invention

The present invention relates generally to a switch device. More particularly, the invention relates to a switch device adapted to be attached to a steering wheel of a vehicle.

2. Description of Relevant Art

In recent years, a control arrangement has been developed for controlling the operation of a variety of equipment installed in a motor vehicle, particularly the various electrical equipment therein such as a radio or other audio devices before which the will of a driver or passenger in a vehicle takes an extreme preference, which arrangement provides a control device, including a computer or microprocessor, to operate such electrical equipment in accordance with a control signal from the control device. According to the arrangement, an associated control system has a simplified structure and a reduced amount of electrical wiring, while in order to output the necessary control signal from the simplified control device it is required that the driver or passenger supply the control device with an operational signal via through an electrical operation switch.

Conventionally, for the arrangement of such a control device and an operational switch in a vehicle, there are employed various layout systems: exemplarily, there is one in which on one hand a control device is mounted on a stationary part of the vehicle such as its body and, on the other hand, an operation switch is installed in a mobile part of the vehicle such as a steering wheel; in consideration of the accessibility for operation.

For a switch device following this type of arrangement, it is inherently necessary to provide a special constitution or structure for connections; such as of a signal line and a power line; between the control device mounted on the vehicle body as a stationary part and the operational switch mounted on the steering wheel as a mobile part.

Exemplarily, of such connections, there have been already devised a number of implements such as an electrical brush and a slip ring.

In this respect, however, when applied as a connection for the mobile operation switch to the stationary control device, such a connection system as using the conventional implements discussed alone may encounter some troubles. Exemplarily, the electric brush may be oxidized at a contact surface thereof, giving rise to a poor contact condition, gradually and resulting in failing stable performance of the entire switch device.

To overcome such problems to a certain extent, there have been already proposed some switch devices which employ a signal line of an optical transmission system, while still retaining the conventional problems attendant the connection of a power line.

As an improvement of such switch devices employing an optical transmission system, there is disclosed a steering switch device in Japanese Patent Lay-Open Print No. 59-25439, in which an optical operation switch only is provided as a mobile part on a steering wheel; and in which an optical operation signal is fed to a control device which is mounted at the side of a stationary part.

More particularly, in this steering switch device, a light beam of a predetermined wavelength is generated by a light source in the control device; conducted through a first optical fiber located at a transmitting side of the steering switch device to the optical operation switch secured to the steering wheel and, in turn, conducted through a second optical fiber located at a receiving side of the steering switch device to a photo sensor of the control device. The optical operation switch is adapted to be operated by a driver of the vehicle who supplies the control device with an optical operation signal.

Accordingly, in the discussed steering switch device, the fact that no power line is installed as a mobile part in the steering wheel in addition to the fact that the signal line is constituted with the optical fibers, without the need of any electrical connection between the mobile and stationary sides of the steering switch device, thus eliminates such conventional problems as aforementioned.

However, in the steering switch device according to the aforesaid Japanese Patent Lay-Open Print, a combination of photo couplers is used as the connection between a first pair of optical fibers extended at the side of the control device which is fixed to a vehicle body; and a second pair of optical fibers stretched from the mobile part at the side of the steering wheel, thereby forming a pair of routes. The respective optical fibers of both routes at the light transmission side and at the light reception side are thus required to have predetermined lengths thereof slacken in consideration of the steering quantity or angle of rotation of the steering wheel.

The two routes of optical fibers being thus slackened are always forced, though inherently having proper flexibility, to deform in a yielding manner or tensioned manner when the steering wheel is rotated.

To avoid such deformations of the optical fibers, a conceptual solution might well be taken that, an optical connection could be made between an optical fiber at the side of a control device and an optical fiber at the side of a steering wheel using an optical slip ring. However conventional optical slip rings as known are all impractical because they are structurally complicated and expensive, and have relatively low light transmission efficiencies.

In this respect, the present invention is designed effectively overcome conventional problems in the art, and particularly, such problems that are yet left unsolved even with the steering switch device according to the aforementioned Japanese Patent Lay-Open Print, that is, those problems concerning the durability as well as the efficiency of light transmission at a connecting part of an optical signal line between a control device on the stationary side and an operation switch on the mobile side.

SUMMARY OF THE INVENTION

According to the present invention there is provided a steering switch device for a vehicle having a vehicle body, a steering wheel rotatably attached to the vehicle body, and an electrical load mounted on the vehicle body. The steering switch device comprises a control means (3, 23, 24, 25, 26) for providing the electric load with a drive control signal, the control means (3, 23, 24, 25, 26) being secured to the vehicle body (1), and a switch means (13, 19, 20, 27) for providing the control means (3, 23, 24, 25, 26) with an operational signal, the switch means (13, 19, 20, 27) being arranged in the vicinity of the steering wheel (100). The control means (3, 23, 24, 25, 26) comprises a light source means (23, 24) for providing an optical signal; and a light-receiving means (25, 26). The switch means (13, 19, 20, 27) comprises a light-conductive path (27) having a light-admitting entry (27a) for receiving the optical signal from the light source means (23, 24) and a light-projecting exit (27b) for sending the optical signal to the light-receiving means (25, 26), optical switch (19, 20) is provided in the light-conductive path (27), which optical switch (19, 20) is adapted to pass and interrupt the optical signal. The control means (3, 23, 24, 25, 26) is adapted to feed the electric load with the drive control signal in accordance with the state of the optical signal as transmitted from the switch means (13, 19, 20, 27) to the light-receiving means (25, 26), also the switch means (13, 19, 20, 27) is adapted to be stationary relative to the vehicle body (1) irrespective of rotation of the steering wheel (100).

Accordingly, an object of the present invention is to provide a steering switch device which increases the durability of an optical signal transmission line without reducing the efficiency of light transmission of the optical signal transmission line.

The above and further features, objects and advantages of the present invention will more fully appear from the following detailed description of a preferred embodiment of the invention when the same is read in conjunction with the accompanying drawings.

BRIEF DESCRIPTION OF THE DRAWINGS

In the drawings:

FIG. 2 is a detailed sectional view showing the structure of the steering switch device along line II—II of FIG. 1.

DETAILED DESCRIPTION OF THE PREFERRED EMBODIMENT

Figure 1:
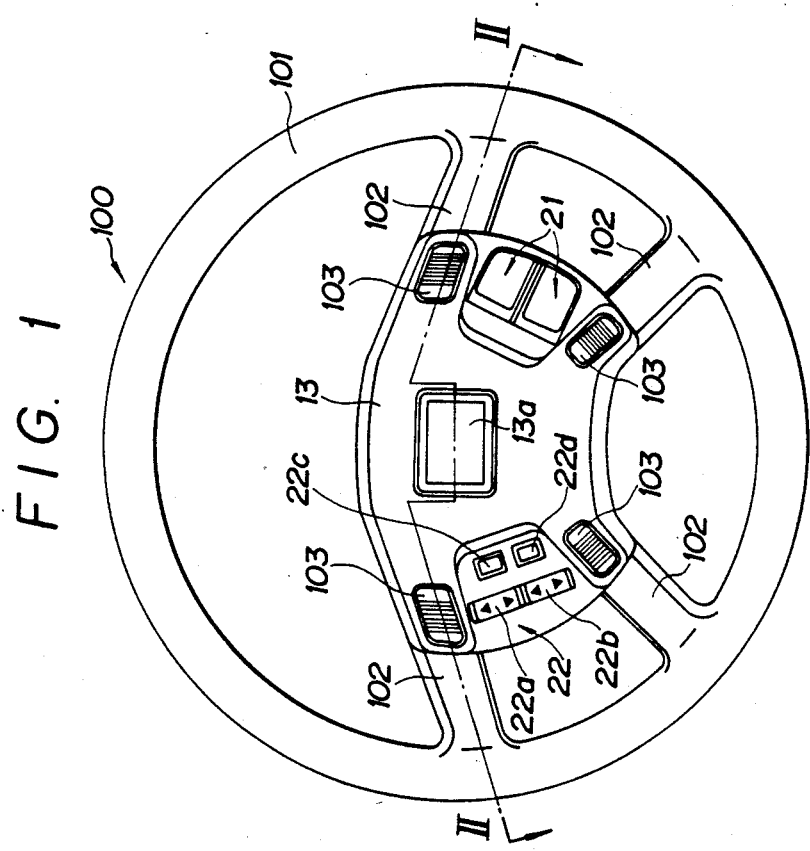
FIG. 1 is a front view of a steering wheel of a vehicle equipped with a steering switch device according to the preferred embodiment of the invention.

Referring first to FIG. 1, designated at reference numeral 100 is a steering wheel of a vehicle equipped with a steering switch device according to a preferred embodiment of the present invention. The steering wheel 100 includes a circular felloe 101 and four spokes 102 and is provided with a resin-molded stationary pad 13 on the front side of the central part thereof.

By means of a later-described dummy planetary gearing, the stationary pad 13 is held to be fixed, as it is shown, irrespective of position of the steering wheel 100 as rotated by an unshown driver of the vehicle.

The stationary pad 13 has arranged thereon four horn switches 103, an operation button 21 as a control for an automatic cruising system (not shown) of the vehicle, and a group 22 of operation buttons as controls for an audio system (not shown) of the vehicle. The operation button group 22 includes a sound volume control button 22a, a tuning button 22b, an on-off button 22c, and an AM/FM select button 22d. Incidentally, designated at reference character 13a is an emblem attached for decorative purpose.

Referring now to FIG. 2 which, as a sectional view along line II—II of FIG. 1, shows the structure of an essential part of the steering switch device 200 according to the invention, designated at reference numeral 1 is a steering column secured to a stationary part (not shown) of the vehicle, the steering column 1 having a steering shaft 2 rotatably provided therethrough. The steering shaft 2 is engaged at an unshown lower distal end part thereof with a rack and pinion mechanism (not shown) operatively connected to a tie-rod (not shown) adapted to finally determine the direction of front wheels (not shown) of the vehicle. At the rear side of the steering wheel 100, around the upper end of the steering column 1, there is provided to be fixed a control device 3, which has built therein various make-and-break switches (not shown) operable with a turn-switch lever 4 and a wiper lever 5. The control device 3 is housed in a casing 3a fastened through a bracket 1a to; and thereby integrally assembled with; the steering column 1.

The steering shaft 2 has in the upper part thereof in FIG. 2, at a distal end portion 2a thereof, a spiral thread cut in the circumference thereof and, therebelow, a spline shaft 2b spline-fitted in a central boss portion 100a of the steering wheel 100.

Between the steering wheel 100 and the casing 3a of the control device 3 is interposed an annular member 8 fixed coaxially with the casing 3a by machine screws 9 to the upper face of the casing 3a, which member 8, thus forming an integral part with respect to the casing 3a, includes in the central part thereof an axially upwardly extending cylindrical portion 8a with a ring-like gear 8c formed thereon, and has defined in the peripheral portion thereof a pair of enclosed spaces S1, S2 for accomodation of optical elements.

Inside the cylindrical portion 8a of the annular member 8, there is disposed a turn switch cancel cam 10 fixedly fitted on the steering shaft 2 and further, above the cam 10, there is intruding a downward projection of the boss portion 100a of the steering wheel 100, with an oilless ring 10a put between the cam 10 and the boss portion 100a.

The spirally threaded upper distal end portion 2a of the steering shaft 2 has a nut 11 screwed thereon to be fixed thereto and an oilless ring 12 fitted on the nut 11, on which ring 12 is tight-fitted the stationary pad 13, so that the pad 13 is free to rotate relative to the nut 11 secured to the distal end portion 2a of the steering shaft 2. The nut 11 has further fitted thereon, at the upper end part thereof, another nut 6 screwed thereto, with a washer 14 put therebetween, to thereby prevent the oilless ring 12 and the pad 13 from slipping off of the nut 11 which is secured to the steering shaft 2.

The stationary pad 13 includes at the bottom side thereof, in the central part thereof, an axially downwardly extending cylindrical portion 13d with another ring-like gear 13c formed thereon, which gear 13c has the same number of teeth as the ring-like gear 8c of the cylindrical portion 8a of the annular member 8.

Figure 4:
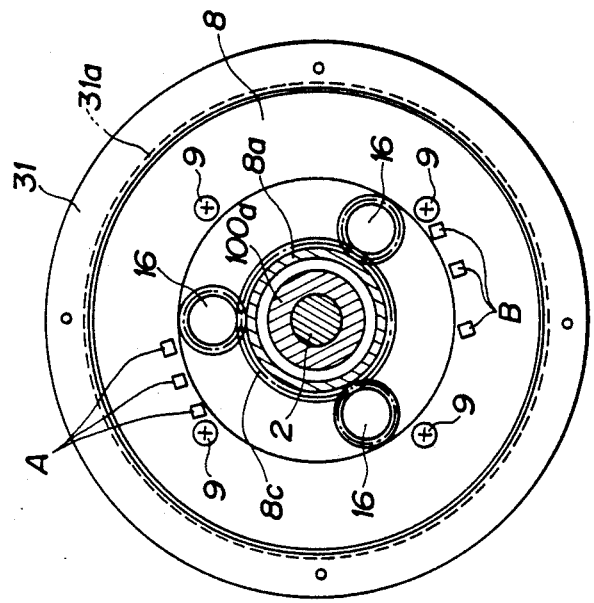
FIG. 4 shows another section of the steering switch device as viewed in the direction of arrows IV, IV of FIG. 2.
Figure 3:
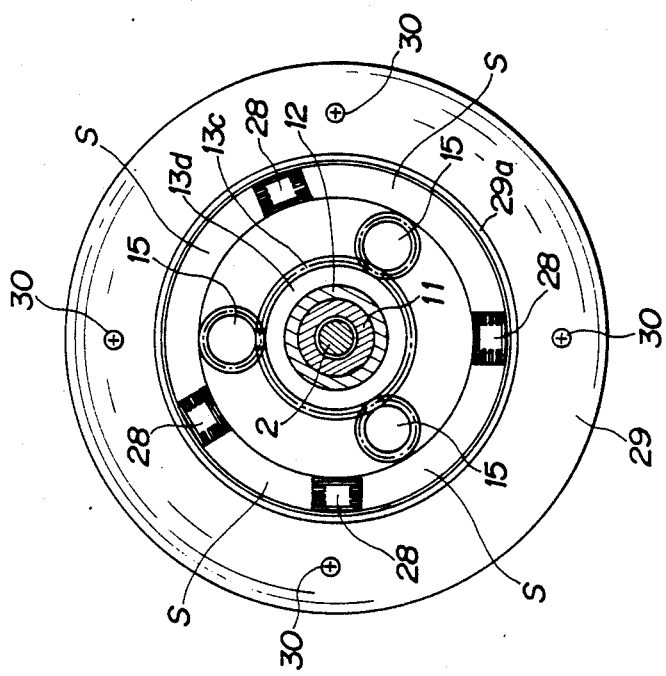
FIG. 3 shows a section of an essential part of the steering switch device as viewed in the direction of arrows III, III of FIG. 2.

As shown in FIGS. 3 and 4, the ring-like upper and lower central gears 13c and 8c are engaged with upper and lower sets of three planet gears 15 and 16, respectively, having tooth portions 15a and 16a formed thereon, respectively, having the same number of teeth. Each of the lower planet gears 16 is formed with an axially projected shaft 16b upwardly extending through corresponding one of three collars 17 fitted in three vertical holes cut through the steering wheel 100, the shaft 16b being fitted at the upper end thereof in the corresponding one of the upper planet gears 15, which one is secured to the shaft 16b to be integral therewith by means of a machine screw 18.

As will be easily understood from the foregoing arrangement of three trains of the gears 8c, 16, 15, and 13c, when the steering wheel 100 is operated in either steering direction, the lower central gear 8c on the annular member 8; as a stationary member in each train; causes each of the lower planet gears 16 meshing therewith to make a rotation thereof as well as a correspondent revolution thereof in accordance with a number of teeth proportional to the operation of the steering wheel 100. Such rotation in turn is transmitted in the form of torque, through the corresponding one of the upper planet gears 15 having the same number of teeth as the lower planet gears 16, to the upper central gear 13c on the stationary pad 13 which as a free member in the train, produces a correspondent rotation of the upper central gear 13c in the opposite direction to the steering direction of the steering wheel 100. In other words, because the upper central gear 13c and the lower central gear have an equal number of teeth as already described, whenever the steering wheel 100 is rotated in either direction, the annular member 8 forces the stationary pad 13c to rotate in the opposite direction, at like angular velocity, and by like quantity of rotation or at like angle in the absolute value, with respect to the steering wheel 100 as a mobile part. Accordingly, even when the steering wheel 100 is rotated, the pad 13 is always kept in a stationary position thereof relative to the inherently stationary members of the vehicle such as the steering column 1, thus effectively serving as a stationary pad member.

The stationary pad 13 has built therein left and right optical switch devices 19, 20, each of which may be of a well-known type that includes a plurality of optical switches adapted to serve for admitting and interrupting light beams to produce optical signals when necessary in accordance with the driver's operation of a set of controls; such as external pushbuttons; provided therefor.

In this embodiment, the optical switch devices 19, 20 are interlocked to cooperate with the automatic-cruising system operation button 21 and the audio-system operation button group 22 provided on the front face of the stationary pad 13.

The annular member 8 has arranged therein, in the space S1, a light-emitting element 23 for emitting a beam of light, and a light-conductive path 24; consisting of an optical element with a light-admitting entry for receiving the light beam from the light-emitting element 23; and, in the space S2 provided opposite to the space S1 or disposed at a symmetrical position thereto with respect to the steering shaft 2, a light-conductive path 25 with a light-projecting exit for projecting a beam of light; and a light-receiving element 26 for receiving the light beam from the light-projecting exit. The light-emitting element 23 comprises a light-emitting diode for converting an electrical signal into an optical signal, while the light-receiving element 26 comprises a photoelectric element such as a photo-diode for converting an optical signal into an electrical signal. Incidentally, in FIG. 2 the necessary electrical connections for the light-emitting element 23 and the light-receiving element 26 have been omitted to simplify the representation.

On the other hand, the stationary pad 13 has arranged on the rear side thereof, in opposition to a light-projecting exit of the light-conductive path 24 and a light-admitting entry of the light-conductive path 25 at the side of the annular member 8, a light-admitting entry 27a of a light-conductive path 27 built with an optical resin through the pad 13; and a light-projecting exit 27b of the light-conductive path 27, respectively. The entry 27a and exit 27b are formed through left and right downwardly projected cylindrical portions 13b of the pad 13, respectively, the cylindrical portions 13b being relatively small in diameter. As a result, in this embodiment, the steering wheel 100 is lying between the exit of the path 24; as at a light source side; and the entry 27a of the path 27; as at an operation switch side, as well as between the operation switch side of the exit 27b of the path 27 and the signal processing side of the entry of the path 25. In this respect, the light-conductive path 27 built in the stationary pad 13 constitutes a light-signal transmitting circuit adapted to conduct a beam a light flux from the light-emitting element 23; as a light source; to the respective optical switch devices 19, 20 and to feed the light-receiving element 26 with a signal of the light flux as sent through or interrupted by the switch devices 19, 20, while the member 8 including the elements 23, 26 and the paths 24, 25 forms a constituent part of the control device 3.

Incidentally, in FIG. 2, although the light-conductive path 27 of the optical resin may appear at a glance as if it is interrupted by the nut 11, there is in fact effectively kept a continuity thereof around the nut 11. Such a continuity may be achieved by using a flexible light conductor by alternately providing a dimensional consideration to clear the nut 11 out of the way of the path 27; or through an air gap having spaced apart thereover a pair of sections of the path 27 arranged exactly opposite to each other without obstacles put therebetween.

Also, the conductiveness of light flux between the light-conductive path 27 at the side of the stationary pad 13 and the light-conductive paths 24, 25 at the sides of the light-emitting element 23 and the light-receiving element 26, respectively, is effectively maintained in a below-described manner, notwithstanding the presence of a central base portion of the spokes 102 of the steering wheel 100 which in a certain design thereof may often stand in the way of the light flux. In a practical design, however, such presence of the central base spoke portion does not constitute any substantial obstacle because, as seen from FIG. 3, the spokes 102 of the steering wheel 100 have free spaces S between respective neighboring ones thereof, thus permitting the light flux to be freely conducted between the light-conductive path 27 and the light-conductive paths 24, 25, respectively.

In this respect, in the depicted embodiment, to cope with increased feasibility of design, there is provided a set of light-conductive portions 28 each respectively arranged at that part of one of the spokes 102 which otherwise would stand, from time to time while being rotated, in the way of light flux between the light-conductive paths 27 and 24, 25. Each of the light-conductive portions 28 may effectively constitute a substantially rigid part of corresponding one of the spokes 102. However advantageously a greater number of such light-conductive portions may be provided than the number of spokes; and thus without correspondency to the position of the spokes, the portions 28 will contribute to the entire rigidity of the steering wheel 100. Moreover, each of the light-conductive portions 28 may preferably comprise a set of optical fibers attached to a corresponding one of the spokes 102.

Further, in the foregoing embodiment including a pair of optical interface systems for intertransmission or projection-reception of light flux: one from a light source to an operation switch and the other from the operation switch to a signal processing part, that is, one at the side of the light-emitting element 23 and the other at the side of the light-receiving element 26, each of such systems may advantageously comprise a plurality of optical interface subsystems independent of one another as necessary, or may preferably include in the way thereof a set of optical projection-reception channels arranged in parallel so that, when at least one of them is interrupted by any of the spokes 102, the remaining optical channel(s) can effect the intertransmission of light flux in an ensured manner. In FIG. 4, there are exemplarily shown respective light-projecting parts of three optical channels A at the light source side and respective light-receiving parts of three channels B at the signal processing side.

Referring again to FIG. 2, designated at reference numeral 29 is a light shielding cover with an upwardly bent cylindrical enclosure 29a for laterally enclosing the downwardly projected cylindrical portions 13b of the stationary pad 13, while preventing light invasion thereinto from an external source. The light shielding cover 29 is secured to the front central face of the steering wheel 100 by means of a machine screw 30. Likewise, the annular member 8 is shielded, against invasion of external light, with a downwardly extending cylindrical portion 31a of a light shielding cover 31 secured by means of a machine screw 32 to the rear central face of the steering wheel 100.

Figure 5:
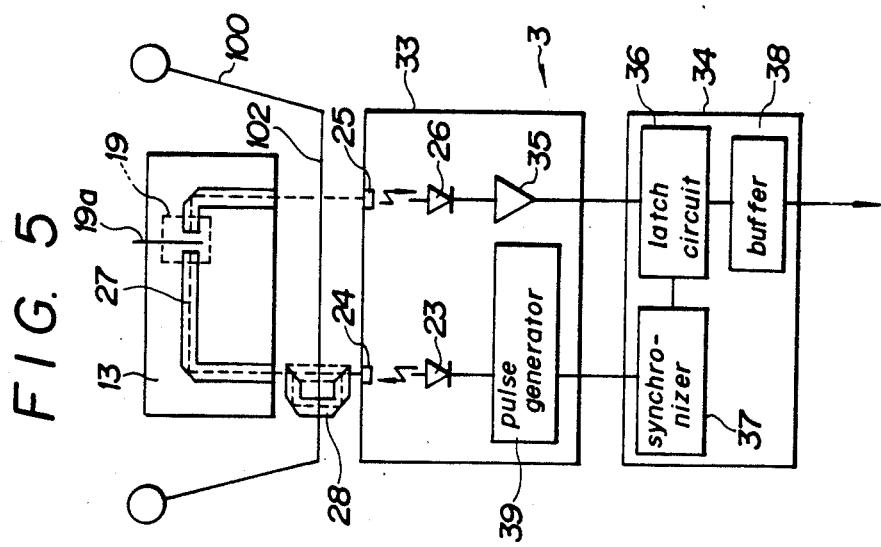
FIG. 5 is a schematic constitutional representation of an optical signal transmission system in the steering switch device.

Referring now to FIG. 5, which is a schematic representation of an optical signal generating and transmitting system of the steering switch device 200, the steering wheel 100 has arranged thereabove the optical switch device 19 built in the stationary pad 13 and therebelow a process section 33 for light-generation and opto-electrical signal conversion and another process section 34 for processing an electric signal, the sections 33, 34 being both fixed in position.

The process section 33 includes an electrical pulse generator 39 for generating an electrical pulse at cycles of a predetermined period, to thereby trigger the light-emitting element 23 to emit a beam of light rays. The light rays emitted from the element 23 are collected into a beam of light flux by the light-conductive path 24, from which the light beam is transmitted through the light-conductive portion 28 of the corresponding one of the spokes 102, if this be lying in the way, to the light-conductive path 27 in the stationary pad 13. From this point at the operation side optical system the light beam is controlled to be either passed through or interrupted by an optical switch 19a in the optical switch device 19, giving rise to an operational signal of beamed light flux, as necessary. In the processing side optical system, the optical operational signal thus produced is conducted through the light-conductive path 27 and transmitted therefrom to the light-conductive path 25, from which it is fed to the light-receiving element 26. The optical signal thus fed is converted by the element 26 into an electrical signal, which is amplified through an amplifier 35 and then, at a latch circuit 36, synchronized by a synchronizer 27 relative to the trigger pulse from the pulse generator 39, before being fed through a buffer 38 to a control circuit (not shown), where it is processed to obtain an electrical control signal to be output to a certain object (not shown) which is to be finally controlled; such as an electrical load. Incidentally, in the processing side optical interface system, the optical signal may be of any suitable form such as of a wavelength multiplication type or a sequentially pulsing type. Moreover, respective associated switching elements may be arranged by way of a voluntary matrix system.

Furthermore, in this embodiment, there may be preferably arranged a collimator lens or a condensing lens at connections of the light-conductive paths 24, 25, 27 and the light-conductive portions 28, as necessary.

As will be understood from the foregoing description, according to the present invention, for vehicles there is provided a steering switch device of an optical signal transmission system which effects the signal transmission by sending and receiving no more than a beam of light flux between an optical switch device arranged in a stationary pad on a rotatable steering wheel, on one hand, and a light generating part and a control circuit both stationary relative to the vehicle body, on the other hand, without the need of electrical connections therebetween, thus eliminating those troubles which otherwise are conventionally attendant to mechanical contacts.

In this respect, the steering switch device according to the present invention includes no light-conductive portions which would be deformed when a steering wheel is rotated, thus successfully achieving increased durability of the light-conductive paths for light transmission, as well as greatly improving the durability of the entire device, even when compared with a steering switch device according to the aforementioned prior art which has arranged at a mobile side thereof an optical operation switch only.

Further, in the device according to the present invention, the light-conductive paths for light transmission do not include such members as a photo-coupler or an optical slip ring, thus causing no reduction in the efficiency of light transmission, and this conventional problem of efficiency reduction has been overcome with a simplified inexpensive structure.

Still more, according to the invention, a steering switch device is constituted with no more than those members arranged around a steering wheel, so that it is easily applicable to any type of commercially available conventional vehicle in the market.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A steering switch device for use in a vehicle having a vehicle body, a steering wheel rotatable relative to said vehicle body, and an electrical load mounted on said vehicle body, said steering switch device controlling said electrical load and comprising:

means for transmitting an optical signal including a light-emitting element secured to said vehicle body;

means for receiving an optical signal including a light-receiving element secured to said vehicle body;

a pad member for said steering wheel mounted on said steering wheel;

means for holding the position of said pad member stationary relative to said vehicle body;

switch means for receiving said optical signal from said signal transmitting means, effecting a controlling operation on said optical signal, and transmitting said optical signal to said signal receiving means, said switch means being disposed in said pad member; and means for actuating said electrical load in accordance with said optical signal received by said signal receiving means.

2. A steering switch device according to claim 1, wherein:

said signal transmitting means further includes a first light-conductive path for conducting said optical signal from said light-emitting element to said switch means, said first path having an exit for said optical signal;

said signal receiving means further includes a second light-conductive path for conducting said optical signal from said switch means to said light-receiving element, said second path having an entry for said optical signal;

said switch means comprises a third light-conductive path and an optical switch associated with said third path, said third path having an entry and an exit for said optical signal; and said exit of said first path and said entry of said third path are arranged in opposed relation for transmitting said optical signal, and said exit of said third path and said entry of said second path are arranged in opposed relation for transmitting said optical signal.

3. A steering switch device according to claim 2, wherein:

said steering wheel has a portion which is capable of passing between said exits and said entries with rotation of said steering wheel, said portion comprising a light-conductive portion for permitting the transmission of said optical signal from said exits to said entries.

4. A steering switch device according to claim 2, further comprising:

shielding means for shielding said exits and said entries from external light.

5. A steering switch device according to claim 2, wherein:

said steering wheel is connected to a steering shaft, and said exit of said first path and said entry of said second path are disposed diametrically opposite to each other with respect to said steering shaft.

6. A steering switch device according to claim 1, wherein:

said holding means comprises a gear mechanism for keeping a relative angular displacement between said pad member and said steering wheel substantially equal to that between said steering wheel and said vehicle body, while keeping the direction of the angular displacement of the pad member relative to said steering wheel opposite to that of said steering wheel relative to said vehicle body.

7. A steering switch device according to claim 6, wherein:

said gear mechanism comprises a first sun gear fixed to said vehicle body through a steering column, a second sun gear fixed to said pad member, a shaft rotatably supported by said steering wheel, a first planet gear fixed to said shaft and engaging said first sun gear, and a second planet gear fixed to said shaft and engaging said second sun gear.

8. A signal transmission device in a vehicle having a vehicle body and a rotable steering wheel with a pad member, for transmitting a signal between a first part on said pad member and a second part on said vehicle body, comprising:

means for holding the position of said pad member stationary relative to said vehicle body; and means for transmitting an optical signal between said first part and said second part.

9. A signal transmission device according to claim 8, wherein said optical signal transmitting means comprises:

an optical signal generator equipped on said second part;

a signal convertor for converting said optical signal to an electrical signal, said signal convertor being equipped on said second part; and optical switch means for receiving said optical signal from said signal generator, effecting a controlling operation on said optical signal, and transmitting said optical signal to said signal converter, said optical switch means being equipped on said first part.

10. A signal transmission device according to claim 8, wherein:

said holding means comprises a gear mechanism for keeping a relative angular displacement between said pad member and said steering wheel substantially equal to that between said steering wheel and said vehicle body, while keeping the direction of the angular displacement of the pad member relative to said steering wheel opposite to that of said steering wheel relative to said vehicle body.

11. A signal transmission device according to claim 10, wherein:

said gear mechanism comprises a first sun gear fixed to said vehicle body through a steering column, a second sun gear fixed to said pad member, a shaft rotatably supported by said steering wheel, a first planet gear fixed to said shaft and engaging said first sun gear, and a second planet gear fixed to said shaft and engaging said second sun gear.

* * * * *

UNITED STATES PATENT AND TRADEMARK OFFICE
CERTIFICATE OF CORRECTION

PATENT NO. : 4,672,214
DATED : June 9, 1987
INVENTOR(S) : Fumitaka TAKAHASHI et al.

It is certified that error appears in the above-identified patent and that said Letters Patent is hereby corrected as shown below:

```
Column 1, line 29, after "via" delete --through--;
         line 51, after "discussed" change "alone" to
--above--;
         line 54, change ", gradually and resulting in "
to --and resulting in gradually--.
Column 2, line 46, after "designed" insert --to--.
Column 3, line 9, change ", optical" to --. An optical--.
Column 5, line 26, after "gear" insert --8c--.
Column 6, line 11, before "exit" insert --the--;
         line 34, after "may" insert --preferably--.
```

Signed and Sealed this

Seventeenth Day of November, 1987

Attest:

DONALD J. QUIGG

*Attesting Officer*  *Commissioner of Patents and Trademarks*